(12) United States Patent
Roberge et al.

(10) Patent No.: US 6,485,087 B1
(45) Date of Patent: Nov. 26, 2002

(54) AIR DRAG REDUCING APPARATUS (75) Inventors: Karic Roberge, Montréal (CA);
Mathieu Boivin, Montréal (CA)

(73) Assignee: Maka Innovation Technologique Inc., Montreal (CA)

( * ) Notice: Subject to any disclaimer, the term of this patent is extended or adjusted under 35 U.S.C. 154(b) by 0 days.

(21) Appl. No.: 09/990,494

(22) Filed: Nov. 16, 2001

(51) Int. Cl.[7] ............................................... B62D 35/00
(52) U.S. Cl. ................... 296/180.5; 296/180.4
(58) Field of Search ..................... 296/180.4, 180.1, 296/180.2, 180.3, 180.5

(56) References Cited

U.S. PATENT DOCUMENTS

4,214,787 A  7/1980  Chain
6,257,654 B1  7/2001  Boivin et al.

Primary Examiner—Joseph D. Pape
(74) Attorney, Agent, or Firm—Merchant & Gould P.C.

(57) ABSTRACT

An air drag reducing apparatus for use with a vehicle having a rear end closed by a pair of doors consists of a rectangular shaped panel having a leading edge hingedly connected to the vehicle, the panel extending at about 16 degrees relative to the rearward projection of a side of the vehicle in a drag reducing position. As the door is opened, an element allows the panel to be moved between the door and the side of the vehicle to a position adjacent the side of the vehicle. As the door is moved back from the opened position to a closed position, the element causes the panel to return to its drag reducing position. The rear of a vehicle includes two side panels and two top panels.

15 Claims, 11 Drawing Sheets

AIR DRAG REDUCING APPARATUS

FIELD OF THE INVENTION

The present invention. relates to an air drag reducing apparatus for use with vehicles having a rectangular rear end closed by a pair of hingedly mounted doors.

BACKGROUND OF THE INVENTION

It is known that a significant amount of air drag results when a vehicle travels over a roadway; this is due to an area of low pressure created at the rear end of the vehicle. For example, with a tractor-trailer type vehicle, the air makes a sharp bend around the squared-off back of the trailer, thus causing turbulence and drag. To overcome this problem, engine power is required and therefore fuel. Furthermore, the turbulence also causes poor visibility in rainy conditions and an accumulation of dirt on the back of trailers.

In the trucking industry, the aerodynamics of vehicles is a growing concern. Tests indicate that fuel savings from aerodynamic improvements are equivalent to fuel savings attained by a chassis weight reduction and require fewer services to maintain. The air resistance or aerodynamic drag of the vehicle increases the power needed by the engine as the speed increases. It is known that a tractor-trailer needs about 100 HP to overtake the air drag at a speed of 55 MPH. Approximately half the energy reaching the drive wheels is required to overcome air resistance at cruising speed. Recent tests reveal that the square back end contributes approximately to 30% of the air drag. Therefore, the addition of aerodynamic device, such as a rear defector, diminishes the air drag and results in lower fuel consumption.

Various devices have been proposed to reduce air drag. One air drag reducing apparatus may be found described in U.S. Pat. No. 4,214,787 issued Jul. 29, 1980 to Chain wherein a pair of trim panels are pivotally connected to the rear end of the vehicle with control means connected between each trim panel and the rear end of the vehicle for maintaining the trim panel in an upward position when the vehicle is moving at a rate exceeding a predetermined minimum velocity. The drag reducing apparatus described in this patent includes a control assembly, which automatically controls the movement of the trim panels between an operating position and a storage position adjacent the vehicle doors. The control system comprises a panel actuator in the form of a ram, which is responsible to the application of pressurized fluid or air by the operator of the vehicle to maintain the panel in the drag reducing position. However, in this drag apparatus, the ram construction does not enable the doors to be moved between a closed position to a completely opened position where the doors are adjacently parallel to the sides of the trailer vehicle.

Another air drag reducing apparatus may be found in applicant's U.S. patent Ser. No. 6,257,654 issued Jul. 10, 2001.

OBJECTS AND STATEMENT OF THE INVENTION

The present invention is concerned with providing an air drag reducing apparatus which overcomes the above-described problems.

More specifically, this is achieved by providing an apparatus which allows the panels to be moved outwardly from a drag reducing position to a position where the doors are in their fully retracted position adjacent their associated sides of the vehicle.

A further object of the present invention is to provide a mechanism which will enable the panels to return back to their drag reducing position whenever the doors are hingedly moved from their retracted position to their end closing position. This is achieved by providing a pressure exerting element which assists the panel to return to its drag reducing position.

The present invention therefore relates to an air drag reducing apparatus for use with a vehicle having a top and opposite lateral sides contiguous with a rear end formed of a pair of hingedly mounted rectangular doors movable between a closed position to a fully open retracted position wherein the doors panels are respectively retracted adjacent to a corresponding side of the vehicle; the apparatus comprising:

a pair of elongated generally rectangular side panels each having opposite short sides and opposite long sides, the long sides defining a leading edge and a trailing edge;

hinge means connecting each side panel allowing for pivotal movement relative to a corresponding door of the vehicle;

means associated with each side panel for maintaining the side panel in a drag reducing position rearwardly of a corresponding closed door wherein the side panel defines an angle of about 16° with a rearward projection of a plane of the corresponding side of the vehicle;

a pair of generally rectangular top panels each having opposite short sides and opposite long sides, the long sides defining a leading edge and a trailing edge; the short sides of the top panels including one short side disposed adjacent an inner face of a corresponding one of the side panels when the side panels are in the drag reducing position; and means associated with the top panels for maintaining the top panels in a drag reducing position rearwardly of a corresponding closed door wherein each top panel defines an angle of about 16° with a rearward projection of a plane of the top of the vehicle; the maintaining means associated with the top panels allowing the top panels to be moved from the drag reducing position to a position lying substantially parallel to a corresponding side of the vehicle between a corresponding side panel and a corresponding door in the fully open position.

In one preferred form of the invention, one short side of the top panels includes means that slidably contact the inner face of the side panels as the vehicle doors are opened.

In another form of the invention, the positioning means consist of gas cylinders connected between the door and the top panel.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
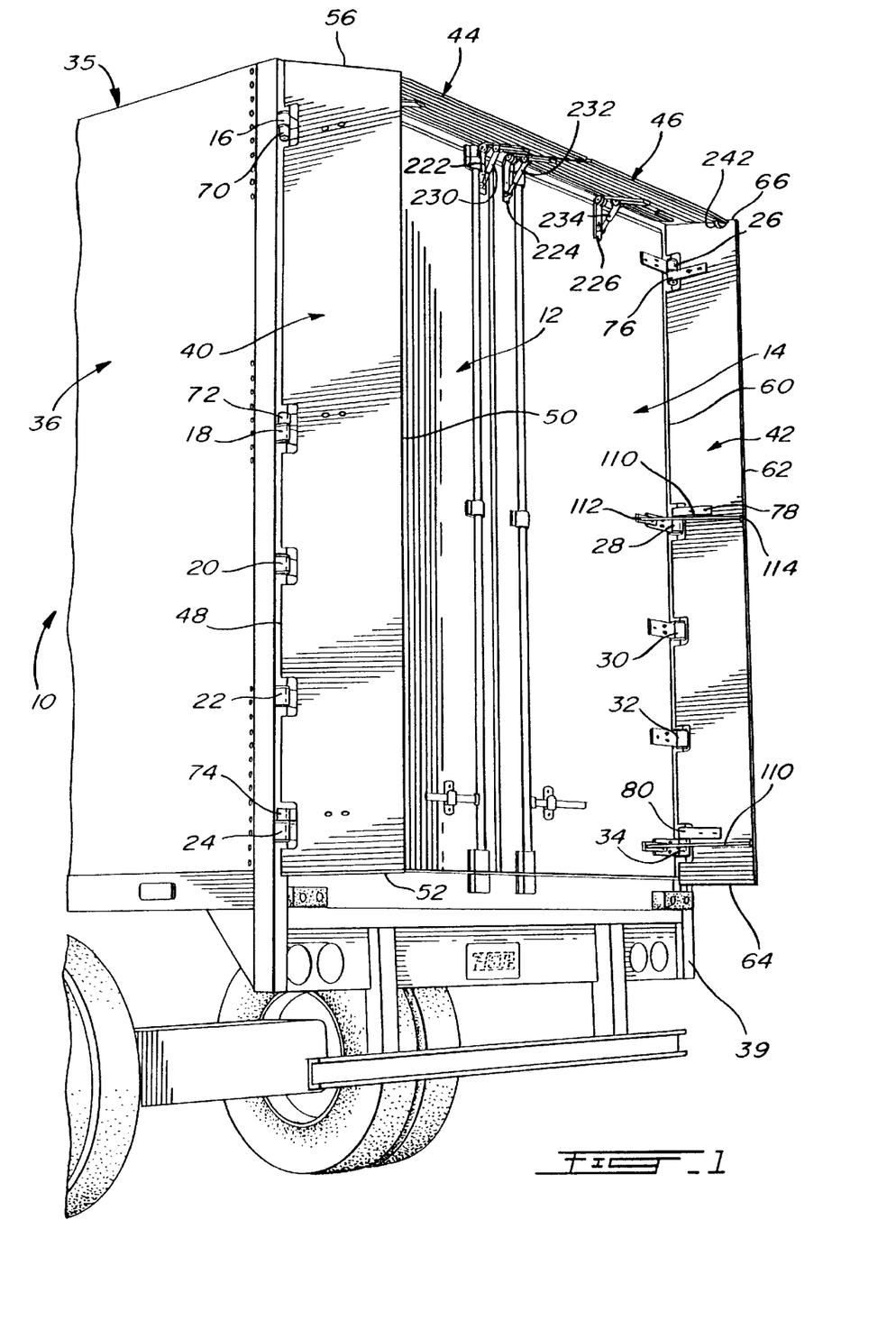
FIG. 1 is a perspective view showing the rear of a vehicle equipped with a series of air drag apparatuses made in accordance with the present invention.

Referring to FIG. 1, there is shown the rear end of a vehicle 10, such as a truck or a trailer, which is closed by a pair of doors 12 and 14 of rectangular shape. The doors are respectively mounted by means of hinges 16, 18, 20, 22, 24 on one side and 26, 28, 30, 32 and 34 on the other side so as to move from their shown closed position to a fully retracted position where they are disposed parallel and adjacent to the opposite sides 36 and 38 of the vehicle.

The present invention is concerned with providing, at the rear of vehicle, an air drag reducing apparatus which in the present case includes a pair of side panels 40 and 42 and a pair of top panels 44 and 46. Panel 40 has a generally elongated rectangular shape with a leading edge 48 and a trailing edge 50 (defining the long sides of the rectangle) and a pair of opposite sides 52 and 56 (defining the short sides of the rectangle). Similarly, the side panel 42 has a leading edge 60 and a trailing edge 62 defining the long sides of the generally rectangular panel and opposite short sides 64 and 66 representing the short sides of the panel. These panels are preferably made of metal, such as aluminum; however, other material, such as plastic or fiberglass, may be used. Also, the width of these panels is preferably of about twenty inches or more.

Figure 1A:
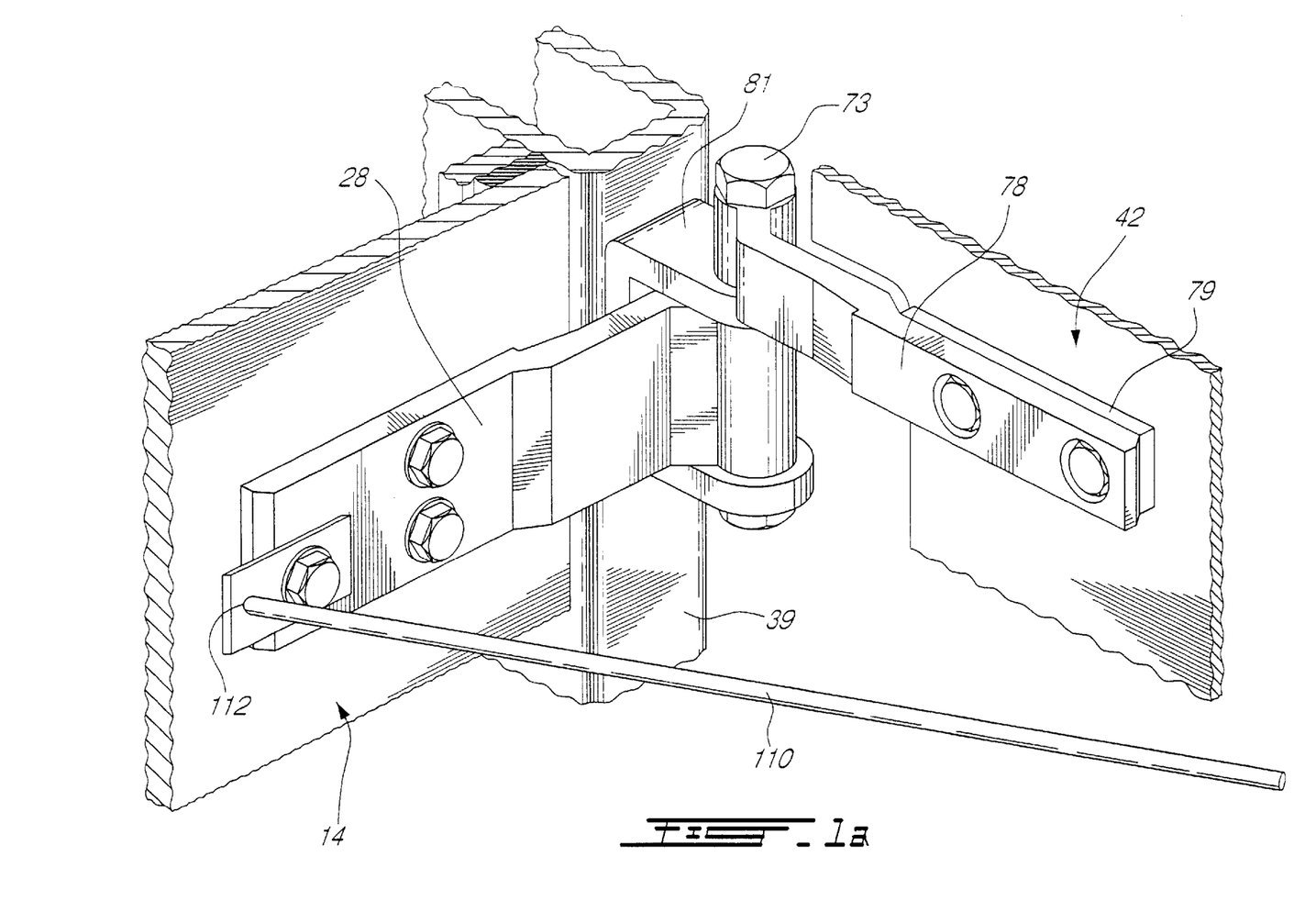
FIG. 1a is an enlarged perspective view of the hinge arrangement of the trailer door and side panel.

Each panel 40, 42 is pivotally mounted at the corner of the vehicle by means of a series of hinges mounted to the pivot pins of the door hinges. FIG. 1 shows three hinges 76, 78, 80 fixed to the inner face of panel 42 and pivotally mounted on the door hinges 26, 28, 34 respectively. FIG. 1 a shows in greater detail that hinge 78 is connected to pin 73 mounted to a C-shaped bracket 81 which is fixedly secured to the rear frame 39 of the side 38 of the trailer. Hinge 28 is also mounted to the pin 73 to allow for the pivotal movement of the door 14. A spacer 79 is provided between the hinge 78 and the panel 42.

One or more cables 110 are provided to retain the side panels 40 and 42 in their 16° angle; for example, referring to FIGS. 1 and 1a, these cables 110 have one end 112 mounted to the hinge 28 and the opposite end 114 mounted to the trailing edge 62 of the side panel 42.

Figure 3:
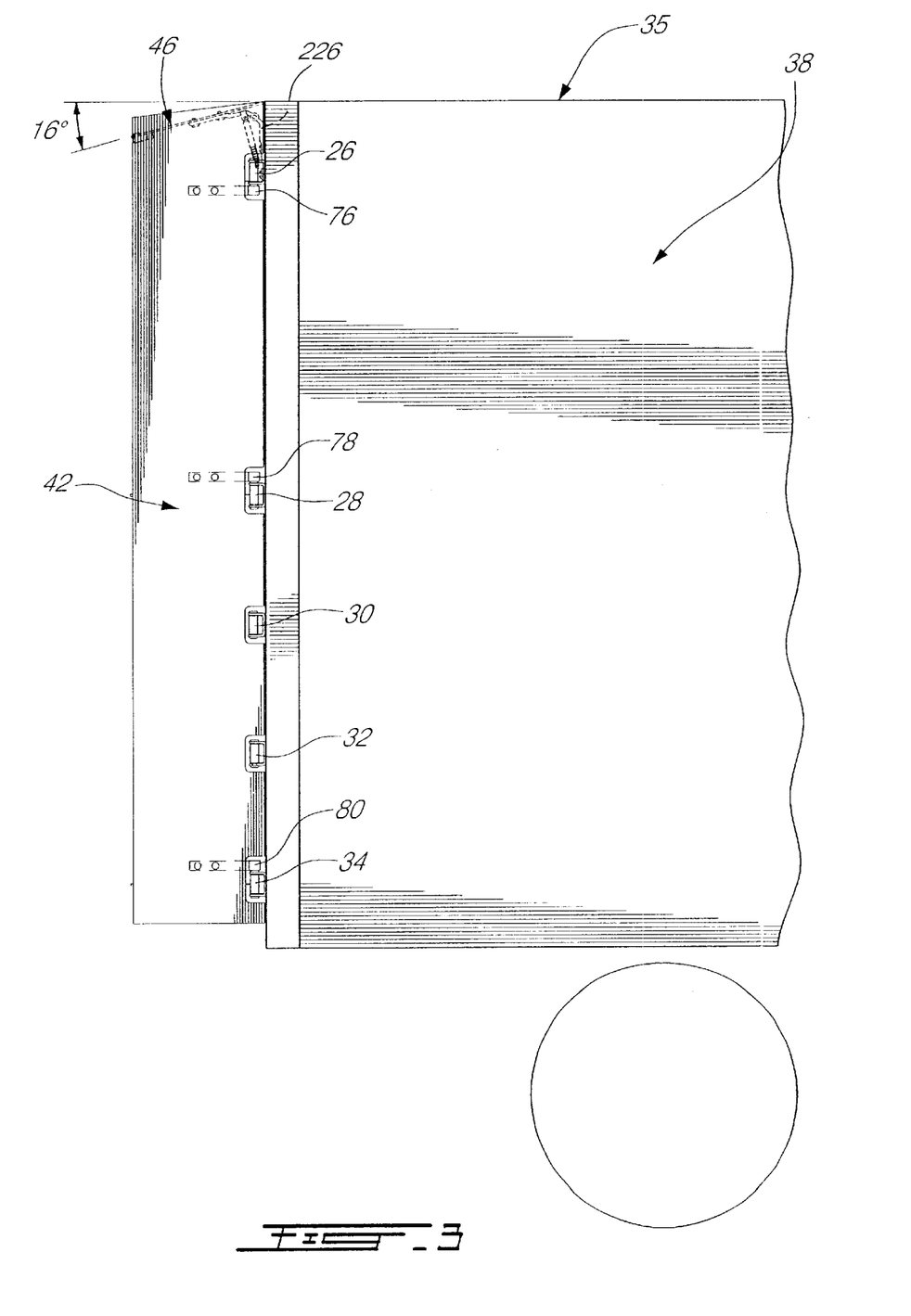
FIG. 3 is an elevational side view of the rear of the vehicle showing one side panel and one top panel.

As explained further below, panels 40 and 42 are positioned in a preferred drag reducing position rearwardly of a corresponding closed panel at an angle of preferably about 16° with the rearward projection of the plane of the corresponding side of the vehicle; FIG. 3 shows this angle with respect to the top side 35 of the vehicle while FIG. 4 shows this angle with respect to the lateral side 36 of the vehicle.

Figure 2:
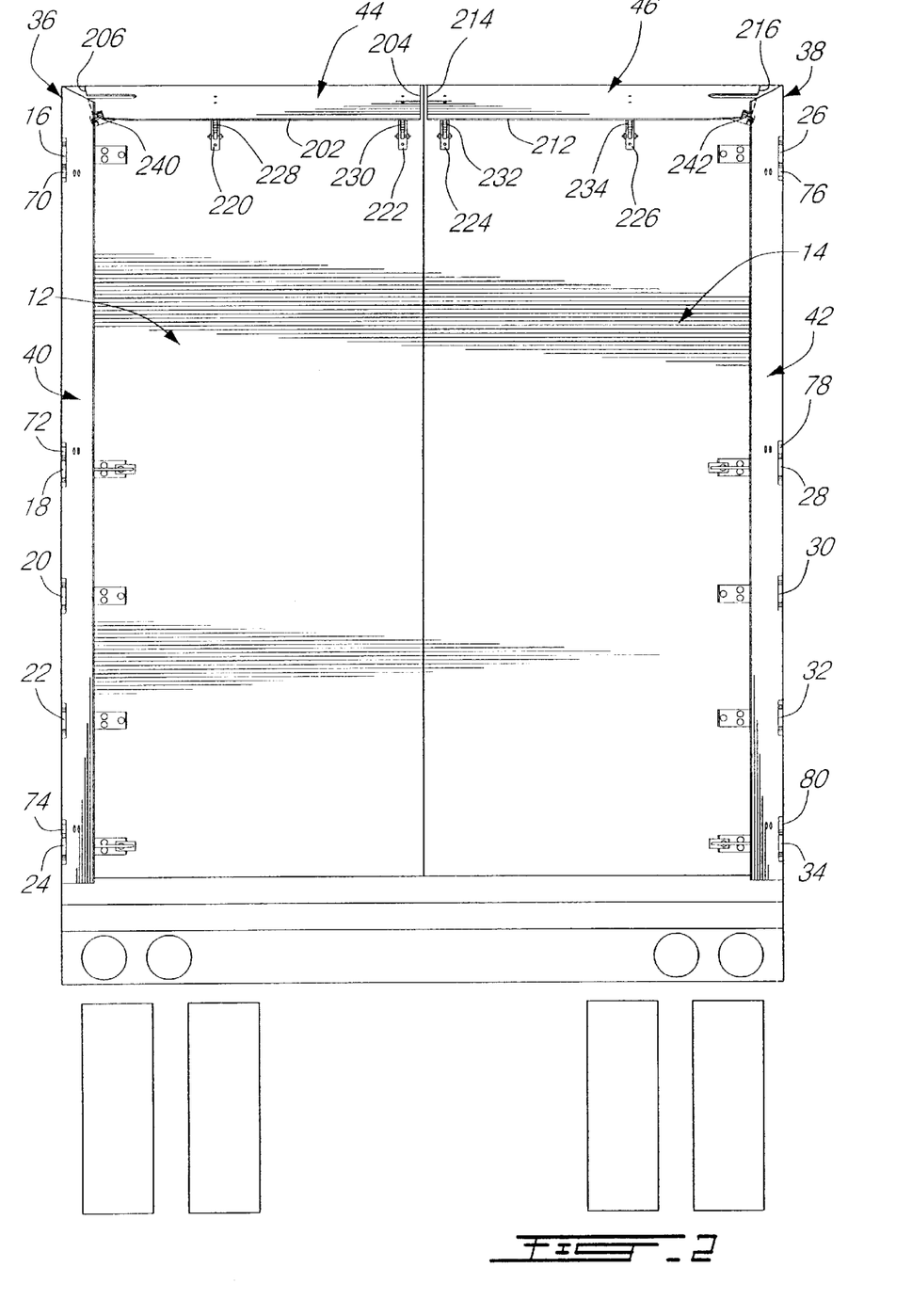
FIG. 2 is an elevational rear view of the vehicle and its panels.
Figure 4:
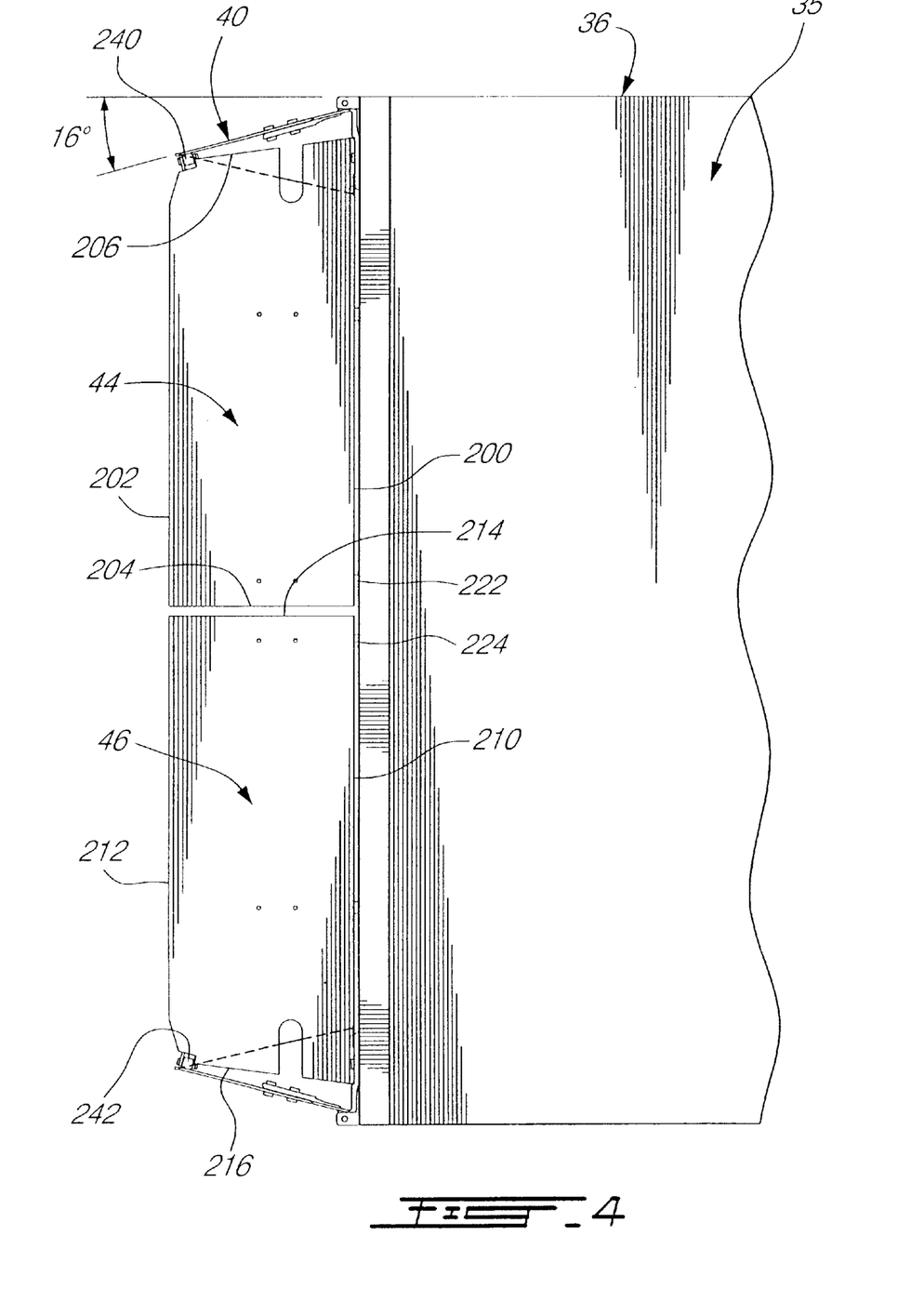
FIG. 4 is a top plan view of the rear of the vehicle and its panels.

With reference to FIGS. 2 and 4, the top panel 44 has a generally rectangular shape with a leading edge 200 and a trailing edge 202 forming the long sides of the panel and a pair of short sides 204 and 206. Similarly, panel 46 has a rectangular shape with a leading edge 210 and a trailing edge 212 forming the long sides of the panel and a pair of opposite short sides 214 and 216.

Referring also to FIG. 1, these panels 44 and 46 are each pivotally mounted to their respective doors 12 and 14 by means of a pair of hinges 220 and 222 (for panel 44) and 224 and 226 (for panel 46).

Figure 5:
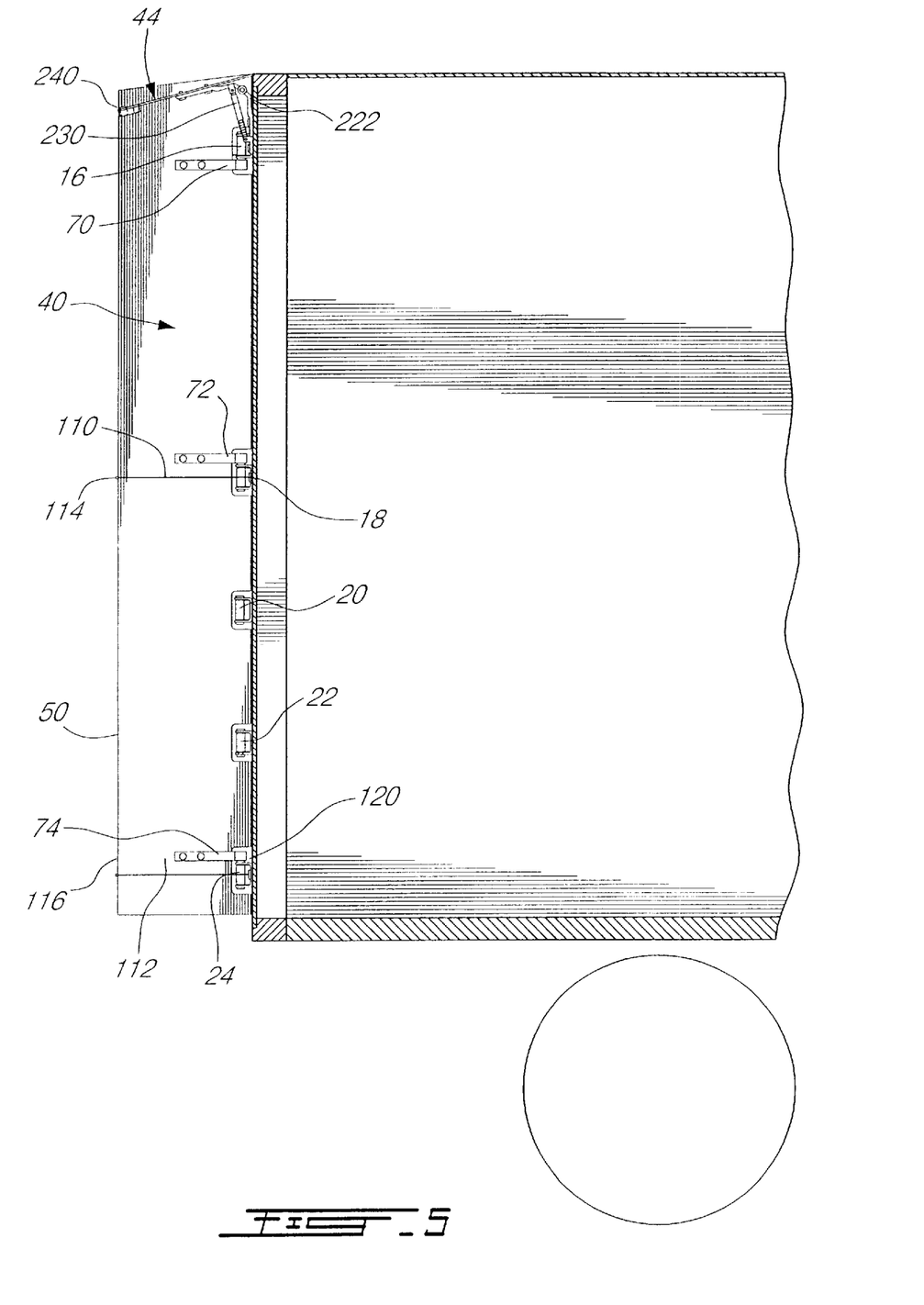
FIG. 5 is an elevational side view of the rear of the vehicle with one side panel removed for clarity purposes.
Figure 5A:
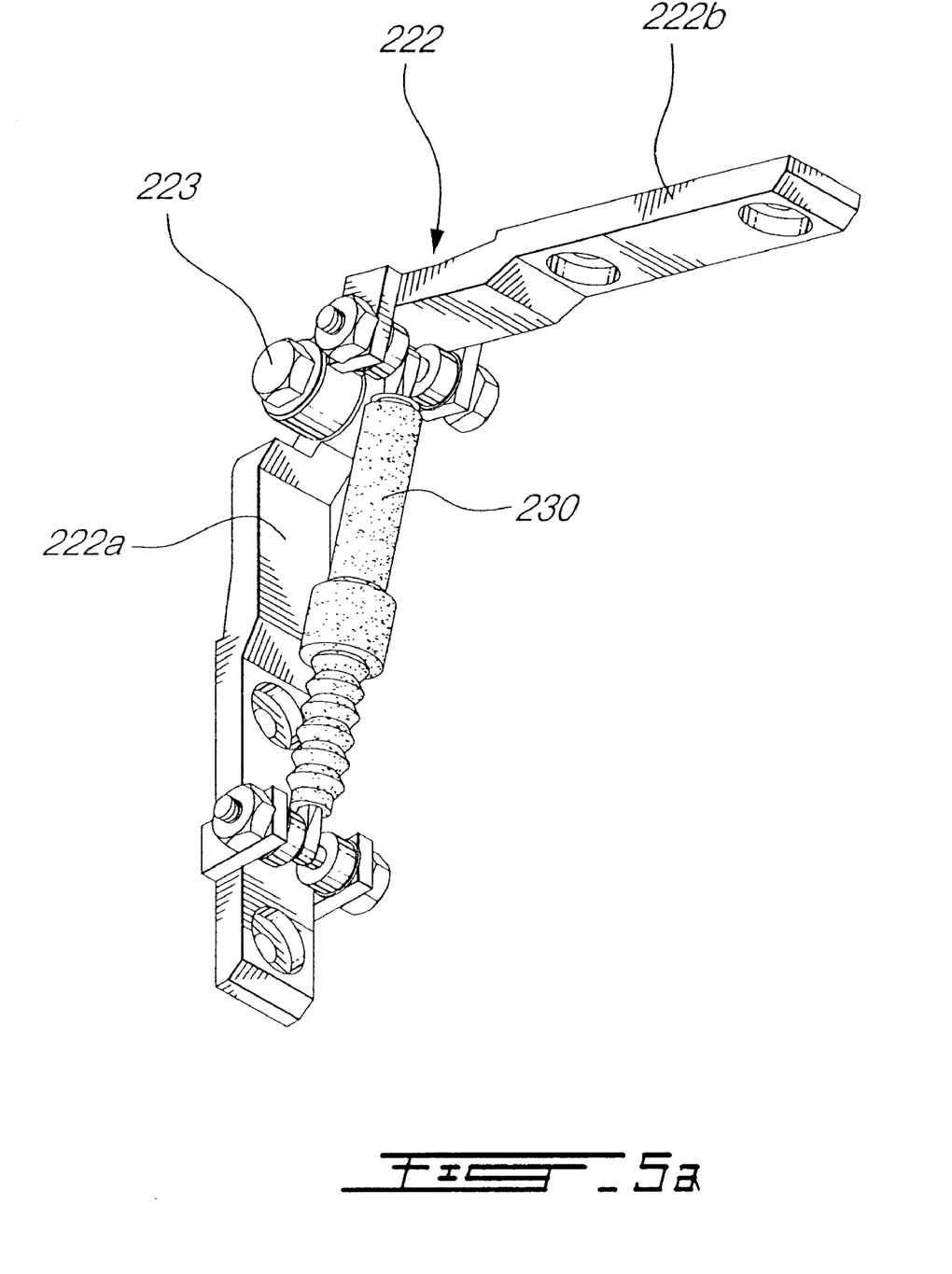
FIG. 5a is an enlarged perspective view of a cylinder arrangement used with the top panels of the invention.
Figure 6:
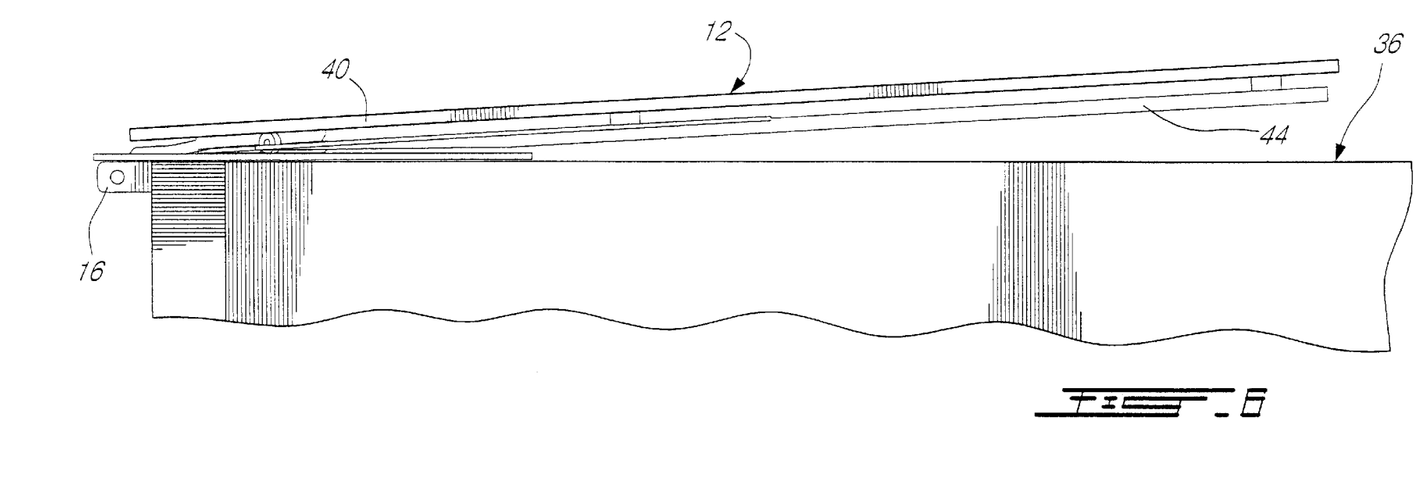
FIG. 6 is a top plan view showing a door with one side and one top panel in the opened position.
Figure 7:
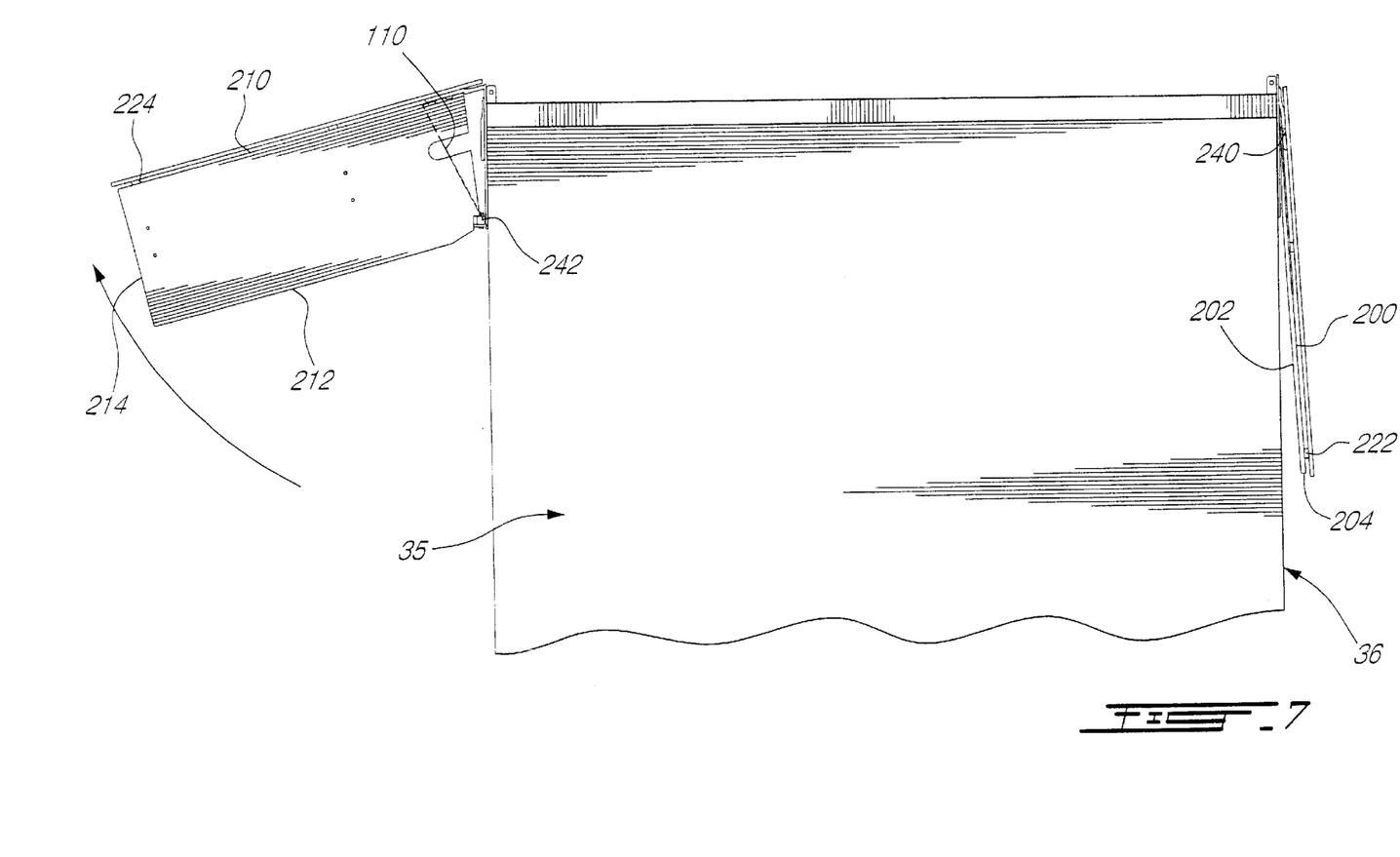
FIGS. 7 and 8 are top plan views showing various positions of the two doors and their top and side panels in a door returning motion.
Figure 8:
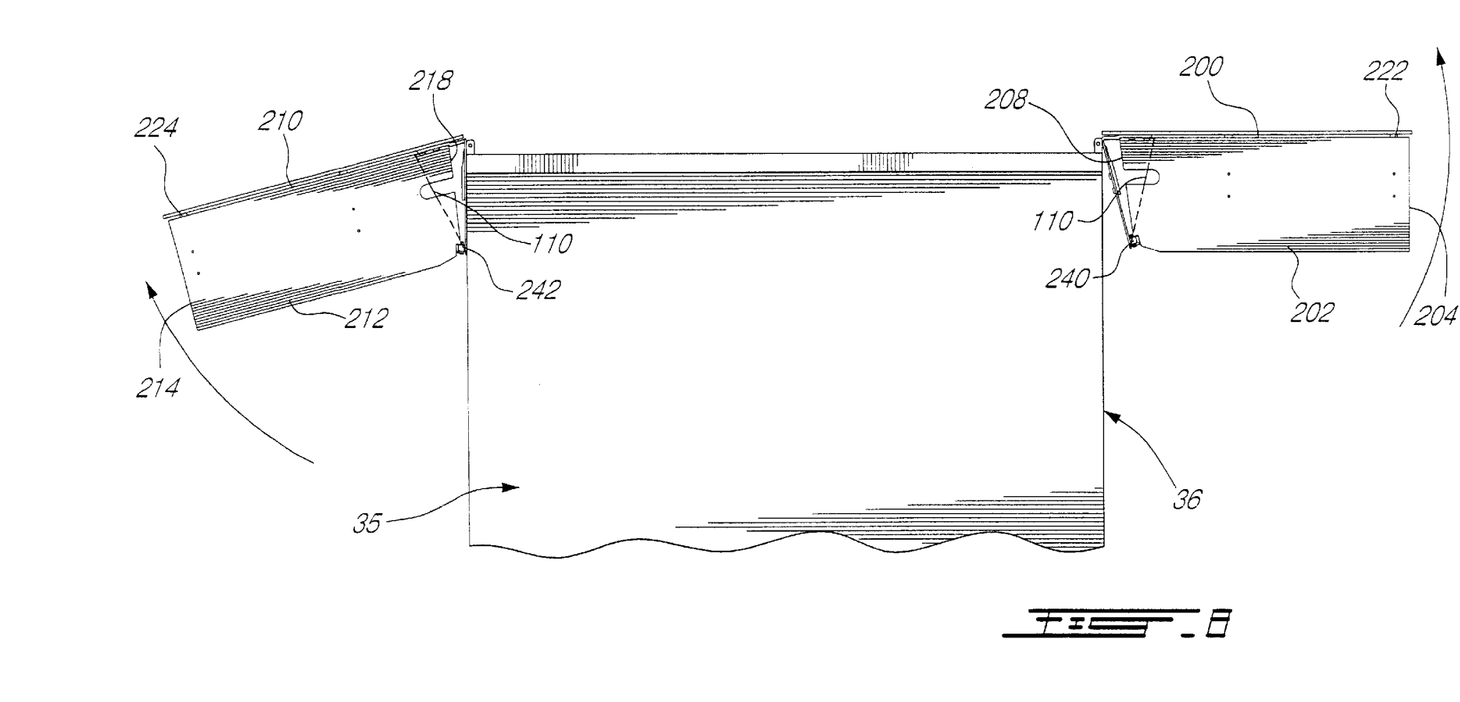

The air drag reducing apparatus of this embodiment of the present invention includes of a pair of gas (inert or air) cylinders 228 and 230 for panel 44 and a pair of gas (inert or air) cylinders 232 and 234 for panel 46. Referring to FIGS. 5 and 5a, one of the cylinder arrangements is shown in greater detail; it consists of a hinge 222 formed of two arms 222a and 222b respectively mounted to the trailer door 12 and the top panel 44 and pivotable about pin 223. The cylinder 230 is pivotally connected, at each extremity, to the arms 222a and 222b. When arm 222b is moved towards arm 222a, the cylinder is compressed. The decompression of the cylinder returns the arms to their original position. In the air drag reducing position illustrated in FIG. 1, all gas cylinders are in their extended positions to maintain the top panels in the preferred air drag reducing angle of about 16° (see FIG. 3). In their air drag reducing positions, the top panels are contained between the upper part of the side panels so that these top panels prevent the side panels to further move inwardly towards the central axis of the vehicle. The outer extremity of each top panel includes a sliding element, such as roller 240, 242, which is adapted to contact the inner face of the side panels.

As the vehicle doors 12 and 14 are opened, the top panels swing outwardly with their respective door, the rollers 240 and 242 contacting the inner face of their corresponding side panels which pivot outwardly about their respective hinges. When the side panels reach contact with their corresponding side of the vehicle, the continuing pivotal movement of the vehicle doors cause the rollers 240 and 242 to roll downward along the side panels while simultaneously causing the compressing of the gas cylinders 228, 230, 232 and 234 until the top panels lie vertically between the side panels (contacting the vehicle side) and the door in its fully retracted position lying substantially parallel to the vehicle side. Although not shown, securing means are provided on the doors to enable the doors to be secured in their fully retracted position. Once these securing means are released, the pressure in the cylinders forces the doors back to their closed position, simultaneously raising the top panels to their drag reducing position where the cylinders reach their fully extended condition. This force exerted by the cylinders also reduces the manual pressure exerted by the operator in returning the doors to their closed position.

Figure 9:
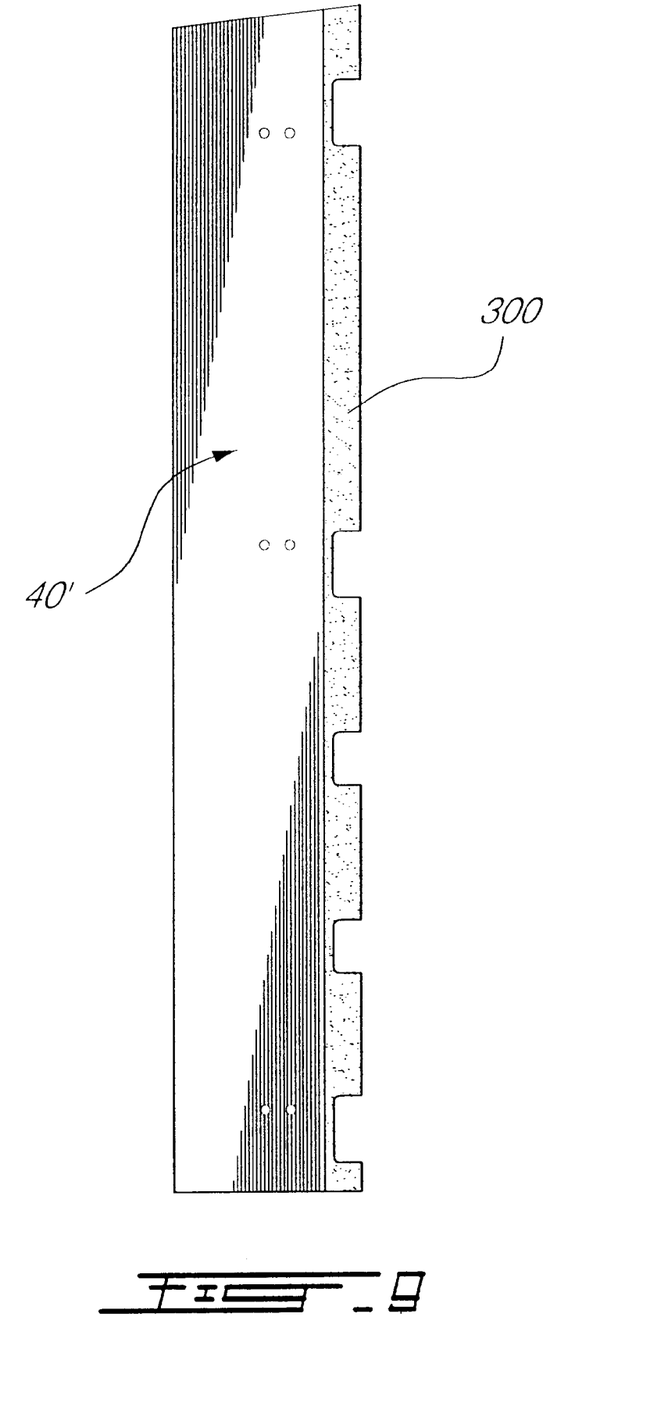
FIG. 9 is an elevational view of a variant of a side panel of the present invention.

Although the invention has been described with respect to two forms of the invention, it will be evident to the person skilled in the art that it may be modified and refined in various ways. For example, referring to FIG. 9, the side panel 40' may be provided with a flexible member 300 made of rubber or like material along its leading edge. This member 300 serves to protect the leading edge when the door and side panel are moved to the outwardly fully retracted position where it is subject to damage as the trailer is moved rearwardly and impact on a solid wall as the like. It is therefore wished to have it understood that the present invention should not be limited in scope, except by the terms of the following claims.

What is claimed is:

1. An air drag reducing apparatus for use with a vehicle having a top and opposite lateral sides contiguous with a rear end formed of a pair of hingedly mounted rectangular doors movable between a closed position to a fully open retracted position wherein said doors are retracted adjacent to a corresponding side of the vehicle; said apparatus comprising:

- a pair of elongated generally rectangular side panels each having opposite short sides and opposite long sides, said long sides defining a leading edge and a trailing edge;
- hinge means connecting each said side panel allowing for pivotal movement relative to a corresponding door of said vehicle;
- means associated with each said side panel for maintaining said side panel in a drag reducing position rearwardly of a corresponding closed door wherein said side panel defines an angle of about 16° with a rearward projection of a plane of the corresponding side of the vehicle;
- a pair of generally rectangular top panels each having opposite short sides and opposite long sides, said long sides defining a leading edge and a trailing edge; said short sides of said top panels including one short side disposed adjacent an inner face of a corresponding one of said side panels when said side panels are in said drag reducing position; and
- means associated with said top panels for maintaining said top panels in a drag reducing position rearwardly of a corresponding closed door wherein each said top panel defines an angle of about 16° with a rearward projection of a plane of the top of the vehicle; said maintaining means associated with said top panels allowing said top panels to be moved from said drag reducing position to a position lying substantially parallel to a corresponding side of the vehicle between a corresponding side panel and a corresponding door in said fully open position.

2. An air drag reducing apparatus as defined in claim 1, wherein said one short side of said top panel includes means to slidably contact said inner face of said side panel as said door is opened.

3. An air drag reducing apparatus as defined in claim 2, wherein said means slidably contacting said inner face consist of rollers.

4. An air drag reducing apparatus as defined in claim 1, wherein said maintaining means associated with said side panels consist of cables having one end connected to said side panel and an opposite end connected to an hinge on said door.

5. An air drag reducing apparatus as defined in claim 1, wherein said maintaining means associated with said top panels consist of compressible means being compressed when said door reaches said fully open position and being decompressed as said door is movingly returned for closure, causing said top panels to return to said drag reducing position while said side panels are returned to said drag reducing position.

6. An air drag reducing apparatus as defined in claim 5, wherein said compressible means consist of gas cylinders having one end fixed to a hinge arm of said doors and an opposite end fixed to a hinge arm on said top panels.

7. An air drag reducing apparatus as defined in claim 1, wherein said doors are mounted to said vehicle by means of door hinges; said hinge means connecting said side panels being mounted to said door hinges.

8. An air drag reducing apparatus as defined in claim 1, wherein each said side panel has its leading edge extending parallel and adjacent to a vertical edge of said door adjacent said vehicle side.

9. An air drag reducing apparatus as defined in claim 1, wherein each said top panel has its leading edge extending parallel and adjacent to an upper horizontal edge of said rear end of said vehicle.

10. An air drag apparatus as defined in claim 1, wherein said rectangular side and top panels have a width of about twenty inches or more.

11. An air drag apparatus as defined in claim 1, wherein said side panels and top panels are made of aluminum.

12. An air drag apparatus as defined in claim 1, wherein said side panels and top panels are made of plastic material.

13. An aid drag apparatus as defined in claim 1, wherein said side panels and top panels are made of fiberglass material.

14. An air drag apparatus as defined in claim 1, wherein said leading edge of each said side panel is formed of a flexible material.

15. An air drag apparatus as defined in claim 1, wherein said side panel includes, along a leading edge thereof, a rubber material.

* * * * *